US007668904B2

(12) United States Patent
Newport et al.

(10) Patent No.: US 7,668,904 B2
(45) Date of Patent: Feb. 23, 2010

(54) SESSION REPLICATION

(75) Inventors: William T. Newport, Rochester, MN (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/191,416

(22) Filed: Jul. 28, 2005

(65) Prior Publication Data

US 2007/0027896 A1 Feb. 1, 2007

(51) Int. Cl.
G06F 7/90 (2006.01)
G06F 15/16 (2006.01)

(52) U.S. Cl. .................... 709/203; 709/228; 702/102
(58) Field of Classification Search ............... 709/203, 709/228; 707/102; 714/20
See application file for complete search history.

(56) References Cited

U.S. PATENT DOCUMENTS

| | | | | |
|---|---|---|---|---|
| 6,442,564 | B1 * | 8/2002 | Frey et al. ............. | 707/103 R |
| 6,502,103 | B1 * | 12/2002 | Frey et al. ............. | 707/103 R |
| 6,549,977 | B1 * | 4/2003 | Horst et al. ............ | 711/113 |
| 7,299,332 | B1 * | 11/2007 | Misra et al. ........... | 711/170 |
| 7,409,420 | B2 * | 8/2008 | Pullara et al. .......... | 709/203 |
| 2002/0016935 | A1 * | 2/2002 | Bergsten et al. ........ | 714/20 |
| 2003/0105805 | A1 * | 6/2003 | Jorgenson .............. | 709/203 |
| 2003/0182464 | A1 * | 9/2003 | Hamilton et al. ........ | 709/314 |
| 2003/0217119 | A1 * | 11/2003 | Raman et al. .......... | 709/219 |
| 2003/0229817 | A1 * | 12/2003 | Colasurdo et al. ....... | 714/4 |
| 2004/0008716 | A1 * | 1/2004 | Stiliadis ................ | 370/429 |
| 2004/0019898 | A1 * | 1/2004 | Frey et al. ............. | 719/330 |
| 2004/0111390 | A1 * | 6/2004 | Saito et al. ............ | 707/1 |
| 2004/0237044 | A1 * | 11/2004 | Travieso et al. ........ | 715/530 |
| 2005/0027797 | A1 * | 2/2005 | San Andres et al. ..... | 709/203 |
| 2005/0144189 | A1 * | 6/2005 | Edwards et al. ........ | 707/102 |
| 2006/0026212 | A1 * | 2/2006 | Tsukerman et al. ...... | 707/200 |
| 2006/0064416 | A1 * | 3/2006 | Sim-Tang .............. | 707/6 |
| 2006/0143217 | A1 * | 6/2006 | Stanev et al. .......... | 707/102 |
| 2006/0167999 | A1 * | 7/2006 | Clark et al. ........... | 709/204 |
| 2006/0193249 | A1 * | 8/2006 | Vu et al. ............... | 370/217 |
| 2006/0281554 | A1 * | 12/2006 | Gatto et al. ........... | 463/42 |
| 2007/0022144 | A1 * | 1/2007 | Chen .................... | 707/204 |

\* cited by examiner

*Primary Examiner*—Alina N. Boutah
(74) *Attorney, Agent, or Firm*—Biggers & Ohanian, LLP

(57) ABSTRACT

Methods, apparatuses, and products are disclosed for session replication that include enqueueing sessions on a replication queue and flushing enqueued sessions, from the replication queue to a replication peer, in dependence upon flushing criteria, for storage on a replication medium. The replication medium may be non-volatile storage in a database or remote random access memory. Flushing may be carried out periodically or in dependence upon replication queue depth. Flushing may include aggregating sessions from the replication queue for transmission to the replication peer.

14 Claims, 7 Drawing Sheets

SESSION REPLICATION

BACKGROUND OF THE INVENTION

1. Field of the Invention

The field of the invention is data processing, or, more specifically, methods, systems, and products for session replication.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. The most basic requirements levied upon computer systems, however, remain little changed. A computer system's job is to access, manipulate, and store information. Computer system designers are constantly striving to improve the way in which a computer system can deal with information.

Information stored on a computer system is often organized in a structure called a database. A database is a grouping of related structures called 'tables,' which in turn are organized in rows of individual data elements. The rows are often referred to as 'records,' and the individual data elements are referred to as 'fields.' In this specification generally, therefore, an aggregation of fields is referred to as a 'data structure' or a 'record,' and an aggregation of records is referred to as a 'table.' An aggregation of related tables is called a 'database.'

A computer system typically operates according to computer program instructions in computer programs. A computer program that supports access to information in a database is typically called a database management system or a 'DBMS.' A DBMS is responsible for helping other computer programs access, manipulate, and save information in a database.

A DBMS typically supports access and management tools to aid users, developers, and other programs in accessing information in a database. One such tool is the structured query language, 'SQL.' SQL is query language for requesting information from a database. Although there is a standard of the American National Standards Institute ('ANSI') for SQL, as a practical matter, most versions of SQL tend to include many extensions. Here is an example of a database query expressed in SQL:

```
select * from stores, transactions
where stores.location = "Minnesota"
and stores.storeID = transactions.storeID
```

A 'transaction' is a group or set of computer program instructions which must be executed atomically, that is, all or none. Consider an accounting entry, for example, a debit of a cash account and a credit of a sales revenue account. If the debit is effected without the credit, the accounts are unbalanced. The debit and credit are therefore wrapped in a transaction, in pseudocode, illustrated as this:

```
BEGIN
    DEBIT CASH $25.00
    CREDIT SALES $25.00
COMMIT
```

The BEGIN command marks the opening of a transaction. The COMMIT command marks the end of the transaction. And the DEBIT and CREDIT are the commands to be executed atomically. If data processing of a transaction proceeds without error, a COMMIT command will succeed and return an indication of success to a calling program. If an error occurs, the COMMIT will fail, and the transaction will 'rollback.' That is, the effects of commands executed during the transaction are reversed, so that the entire transaction is undone, as if it never began. That is atomic execution of a transaction, all or nothing.

The Java programming environment provides transaction support for Java programs. In the state of the art, however, each transaction is executed separately. Each computer program instruction in a transaction, including the BEGIN and COMMIT instructions, represents an instruction to be issued from the Java environment to a DBMS. Each instruction within a transaction requires DBMS optimization and execution in the DBMS. Each separate transaction is also scoped as a transaction in the DBMS itself, incurring transaction processing overheads in the DBMS. Over millions of transactions, separate processing of each transaction therefore represents substantial inefficiency in data processing of transactions for Java programs.

The Hypertext Transfer Protocol ('HTTP') employed for web browser to web server requests is a stateless protocol. As a result, a web server has no means of associating a series of requests with a specific browser or user. The HTTP session API component of the Java Servlet specification provides a mechanism for web applications to maintain a client's state information, and this mechanism addresses some of the problems with other options for maintaining state, such as those based solely on cookies. This mechanism, known as a session, allows a web-application developer to maintain user state information on the server.

It's almost impossible to visit any interactive web site today that does not make use of the HTTP session API. By providing multiple options for tracking a series of requests and associating those requests with a specific user, HTTP session allows applications to appear dynamic to application users. The most often cited example of an HTTP session is the creation of a "shopping cart" for shoppers on a web site. In this example, information associating the user and their prior navigation through the web site and their selections are stored as objects in HTTP session. Once the users are ready to check out from the web site and purchase their selections, the application typically constructs a page composed of all the selected items stored in the "shopping cart." By maintaining application state between browser requests, HTTP session overcomes the default stateless behavior for HTTP requests.

HTTP session replication is vital to almost every online business to maintain information about a user's session and provides a high quality of service to the end user. To maintain consistent uptime and provide a fault tolerant failover system HTTP session are often replicated either in a database or on another machine such as a peer application server in case a single machine fails, the client does not lose session data and can continue interaction with a service by having client requests routed to a different machine. Currently, however, most applications are CPU bound regarding the ability to replicate sessions effectively because of the overhead associated with serializing each session to be replicated followed by the actual process of transmitting the serialized session to either a database or a memory to memory replicated application server.

SUMMARY OF THE INVENTION

Methods, apparatuses, and products are disclosed for session replication that include enqueueing sessions on a replication queue and flushing enqueued sessions, from the replication queue to a replication peer, in dependence upon flushing criteria, for storage on a replication medium. The replication medium may be non-volatile storage in a database or remote random access memory. Flushing may be carried out periodically or in dependence upon replication queue depth. Flushing may include aggregating sessions from the replication queue for transmission to the replication peer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
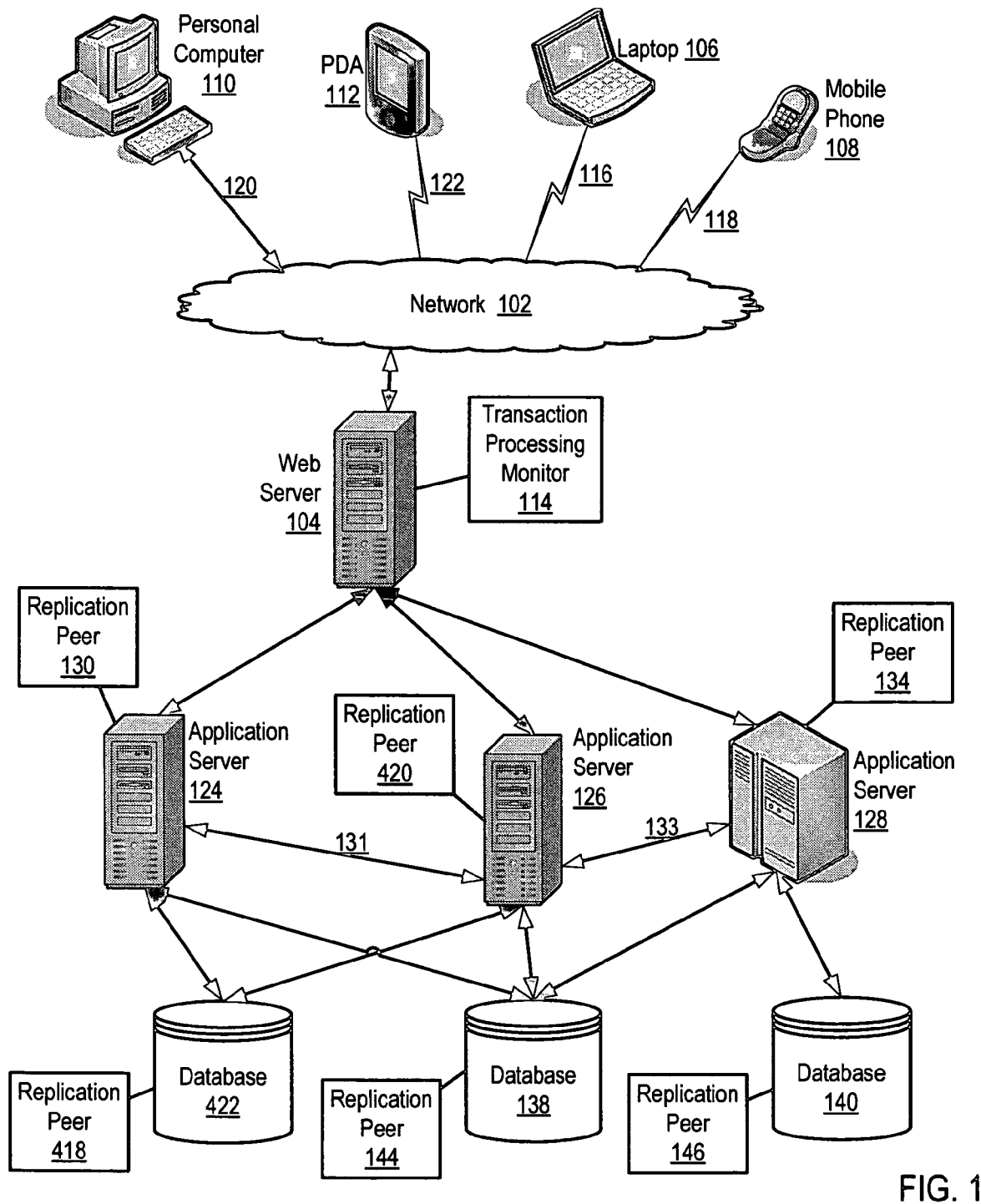
FIG. 1 sets forth a network diagram illustrating an exemplary system for session replication according to embodiments of the present invention.

Exemplary methods, apparatuses, and products for session replication according to embodiments of the present invention are described with reference to the accompanying drawings, beginning with FIG. 1. FIG. 1 sets forth a network diagram illustrating an exemplary system for session replication according to embodiments of the present invention. The system of FIG. 1 operates generally to replicate sessions according to embodiments of the present invention by enqueueing sessions on a replication queue and flushing enqueued sessions from the replication queue to a replication peer in dependence upon flushing criteria for storage on a replication medium. A session is a data structure that maintains or stores information pertinent to a group or series of requests across two or more requests for computer resources or services. Flushing enqueued sessions from a replication queue typically include aggregating sessions from the replication queue for transmission to the replication peer. Examples of replication media include non-volatile storage in a database having a replication peer and remote random access memory in a server having a replication peer.

The system of FIG. 1 represents a multi-tiered system architecture with a tier of clients (110, 112, 106, 108), a tier of application servers (124, 126, 128), and a tier of non-volatile storage in databases (422, 138, 140). This multi-tier client/server architecture improves performance and flexibility for systems with a large number of users. Flexibility in partitioning can be as simple as "dragging and dropping" application code modules onto different computers in some multi-tier architectures.

This multi-tiered system has evolved from a more conventional system architecture in which clients retrieve information from a database, process the data according to instructions from a user, and store the data in the database. The clients in the conventional system architecture have three types of computer instructions installed and running on them to process information: code for the user interface (displaying buttons and lists of data), code for interacting with the database to fetch or store data, and code that processes the fetched data according to commands from the user interface or business logic. In contrast, in the multi-tiered system architecture, the client may contain only user interface code. The code for interacting with the database and processing the data is installed and operating on a middle-tier of servers ('application servers,' in the example of FIG. 1). The middle tier of servers interacts with the database and processes data on behalf of the client. The multi-tiered system of architecture therefore has these advantages: the forced separation of user interface and business logic, a low bandwidth requirement for the network, and the concentration of business logic code in a few machines—rather than inserting business logic into all application software on all of thousand or millions of clients.

There are a variety of ways of implementing this middle tier, such as transaction processing monitors, message servers, or application servers. The middle tier can perform queuing, application execution, and database staging. For example, if the middle tier provides queuing, the client can deliver its request to the middle layer and disengage because the middle tier will access the data and return the answer to the client. In addition, the middle tier adds scheduling and prioritization for work in progress.

The exemplary web server (104) of FIG. 1 also has installed and operating on it a transaction processing monitor ('TPM') (114). The TP monitor technology is a type of message queuing, transaction scheduling, and prioritization service where the client connects to the TP monitor (middle tier) instead of the database server. The transaction is accepted by the monitor, which queues it and then takes responsibility for managing it to completion, thus freeing up the client. The TPM (114) provides applications' services to many clients by multiplexing client transaction requests onto a controlled number of processing routines that support particular services.

The system of FIG. 1 includes several exemplary clients (110, 112, 106, 108). A client is a computer or a process or thread running on a computer that requests resources or services from another computer. Exemplary clients of FIG. 1 include:

- a personal computer (110) coupled to the network (102) through a wireline connection (120),
- a personal digital assistant ('PDA') (112) coupled to the network (102) through a wireless connection (122),
- a laptop computer (106) coupled to the network (102) through a wireless connection (116),
- and a mobile telephone (108) which is coupled to the network (102) through a wireless connection (118).

The system of FIG. 1 includes a data communications network (102) which provides for data communications among clients (110, 112, 106, 108) and web server (104). A network is a group of computers coupled for data communications according to data communications protocols through other computers typically referred to as 'routers,' 'bridges,' or 'switches.' (The routers, bridges, and switches are not shown on FIG. 1.)

The system of FIG. 1 includes web server (104). A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol ('WAP'), the Handheld Device Transport Protocol ('HDTP'), and others as will occur to those of skill in the art. The web server (104) provides static web pages in responses to clients as well as dynamic web pages in such formats as Java Server Pages ('JSP'), PHP Hypertext Processor ('PHP') pages, Microsoft's Active Server Pages™ ('ASP'), and Common Gateway Interface ('CGI') scripts, and others as will occur to those of skill in the art.

Some caution is advised in use of the terms 'client' and 'server' because whether a particular computer acts as a client or a server depends upon role. In the system of FIG. 1, for example, when web server (114) receives from personal computer (110) a request for a web page, web server (104) is acting as a server; when, however, web server (104) requests resources from application server (124) in order to fulfill the request from personal computer (110), web server (104) acts as a client.

The system of FIG. 1 also includes application servers (124, 126, 128) coupled for data communications to web server (104). The application servers (124, 126, 128) are also connected to databases (422, 138, 140) and to each other (131, 133). The system of FIG. 1 also includes non-volatile storage in the form of databases (422, 138, 140). The application servers (124, 126, 128) and the databases (422,138, 140) have installed and operating on them replication peers (130, 420, 134, 418, 144, 146). A peer is a computer or a process or thread running on a computer that has the same capabilities of requesting and responding to requests as other computers similarly situated in a network. A replication peer is a software module that stores on a replication medium sessions flushed from a replication queue. A replication peer (418, 144, 146) may store a session from an application server (124, 126, 128) to non-volatile storage in a database (138, 140, 422). A replication peer (130, 420, 134) also may store (131, 133) a session from an application server (124, 126, 128) into remote random access memory on another application server.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may be implemented as local area networks ('LANs'), wide area networks ('WANs'), intranets, internets, and others as will occur to those of skill in the art. Networks in such data processing systems may support many data communications protocols, including, for example, the Transmission Control Protocol ('TCP'), the Internet Protocol ('IP'), the HyperText Transfer Protocol ('HTTP'), the Wireless Access Protocol ('WAP'), the Handheld Device Transport Protocol ('HDTP'), and others as will occur to those of skill in the art. Various embodiments of the present invention may be implemented on a variety of hardware platforms in addition to those illustrated in FIG. 1.

Figure 2:
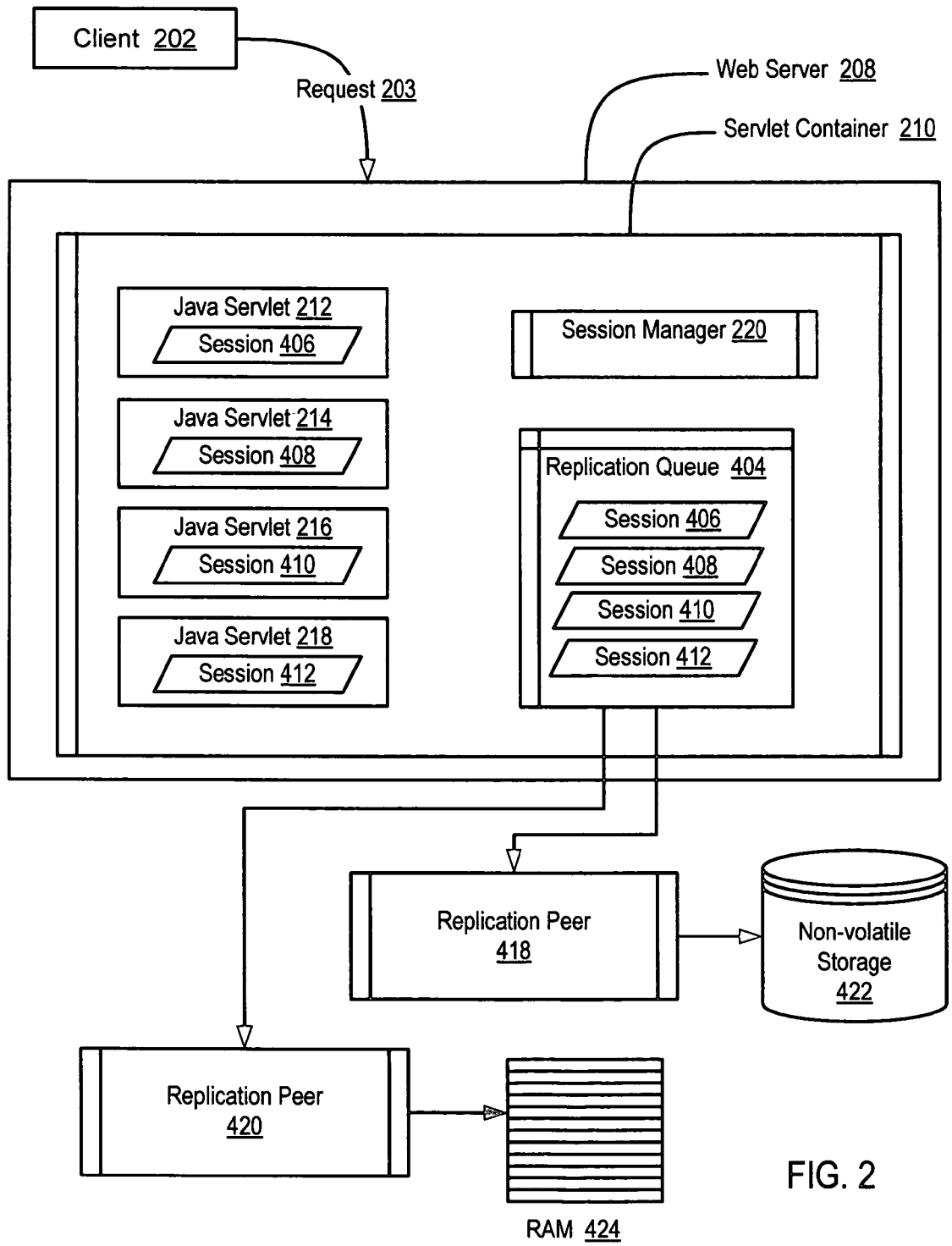
FIG. 2 sets forth a block diagram illustrating a further exemplary system for session replication according to the embodiments of the present invention.

For further explanation, FIG. 2 sets forth a block diagram illustrating a further exemplary system for session replication according to the embodiments of the present invention. The system of FIG. 2 includes a client (202) which may be implemented, for example, as one of the clients (110, 112, 106, 108) of FIG. 1, or otherwise as will occur to those of skill in the art. The system of FIG. 2 also includes a web server (208). Web server (208) receives requests (203) from clients and processes the requests through business logic implemented in this example with Java servlets (212-218). In the example of FIG. 1, not only web server (104) but also application servers (124, 126, and 128) may be implemented with web servers such as the one illustrated at reference (208) in FIG. 2—because requests may be forwarded from web server (104 of FIG. 1) acting as a client to application servers (124, 126, 128) each of which then acts as a server.

Servlets (212-218) are deployed as a web application in a Java servlet container (210). A servlet is a type of server-side functionality in a request-response model. More particularly, a Java servlet is a Java programming language class that extends the capabilities of servers that host access to applications via a request-response programming model. Although servlets can respond to any type of request, they are commonly used to extend the applications hosted by web servers. For such applications, Java defines HTTP-specific servlet classes. Although many example of server-side functionality in the present specification are expressed in terms of Java and Java servlets, in fact, any type of server-side functionality as will occur to those of skill in the art may be used for session replication according to embodiments of the present invention, and the use of all such types of server-side functionality for session replication are well within the scope of the present invention. Examples of such server-side functionality include the Common Gateway Interface ('CGI'), the PHP Hypertext Protocol ('PHP'), and Microsoft's Active Server Pages ('ASP').

A servlet container (210) runs in the web server (208), which is to say that web server (208) 'has a' reference to a servlet container object. The servlet container (210) implements and manages servlets (212-218). In the case of Java, for example, the servlet (212) may be an instance of a concrete subclass of the HttpServlet abstract class.

Web server (208) or servlet container (210) may pass an HTTP as a parameter in a method call to service methods in the servlets (212-218). Servlet container (210) may, for example, create an HttpServletRequest object and pass the HttpServletRequest object as a parameter in a method call to the service method in one of the servlets (212-218). The service method dispatches the request represented by the HttpServletRequest object to one of the servlet's (212) service methods, for example, doGet( ) or doPost( ). Each servlet (212-218) in the system of FIG. 2 also has a session (406-412), a data structure that maintains or stores information pertinent to a group or series of requests across two or more requests for computer resources or services. The sessions (406-412) are queued into a replication queue (404) for flushing to one or more replication peers (418, 420) for storage on remote random access memory ('RAM') (424) or non-volatile storage (422). A session manager (220) manages the sessions and determines when to flush the replication queue according to flushing criteria.

Session replication in accordance with the present invention is generally implemented with computers, that is, with automated computing machinery. In the system of FIG. 1, for example, all the servers, replication peers, databases, clients, and so on, are implemented to some extent at least as computers. For further explanation, therefore, FIG. 3 sets forth a block diagram of automated computing machinery comprising an exemplary computer (152) useful in session replication according to embodiments of the present invention. The computer (152) of FIG. 3 includes at least one computer processor (156) or 'CPU' as well as random access memory (168) ('RAM') which is connected through a system bus (160) to processor (156) and to other components of the computer.

Stored in RAM (168) is a transaction processing monitor ('TPM') (114), computer program instructions for providing applications services to clients by multiplexing client transaction requests across processing routines on a number of application servers. Also stored in RAM (168) is an application server (416), computer program instructions that implement business logic in processing routines for responding to client requests. Application servers may be implemented, for example, as Java servlets. Also stored in RAM (168) is a servlet (704), computer program instructions for facilitating dynamic content for use in responding to client requests and used in various embodiments of the present invention to implement processing routines for business logic in application servers.

Also stored in RAM (168) is a session (406), a data structure that maintains or stores information pertinent to a group or series of requests across two or more requests for computer resources or services. Also stored in RAM (168) is a replication queue (404), a data structure having member elements each of which represents a session to be replicated. Also stored in RAM (168) is a web server (208), computer program instructions receive, process, and respond to client requests. Also stored in RAM (168) is a servlet container (148), computer program instructions for facilitating the operation of servlets (704). A servlet container (148) controls the servlets (704) that are deployed within the web server (208) and is responsible for forwarding the requests and responses for them. The servlet container (148) maps a URL to a particular servlet (704) and ensures that the client requesting the URL has the correct access rights. The servlet container receives requests from the web server, parses the requests into servlet request objects, and passes the servlet request objects to the proper servlets. The servlet container therefore effectively routes requests toward applications implemented with servlets, possibly on a number of application servers, selecting the applications to invoke and the order in which they are invoked. Rules defining the applications and their order of invocation are set forth in an application's deployment descriptor.

Also stored in RAM (168) is a session manager (220), computer program instructions for managing sessions (406). Also stored in RAM (168) is a replication peer (186), computer program instructions that store on a replication medium sessions flushed from a replication queue. Although the embodiment of the present invention as depicted in FIG. 3 employs Java technology supporting Java Server Pages ('JSP'), the use of other dynamic web page technology such as PHP, ASP, Microsoft.net, and CGI/Perl will also fall within the scope of the present invention.

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. Operating system (154), TPM module (114), web server module (208), and application server module (416) in the example of FIG. 3 are shown in RAM (168), but many components of such software typically are stored in non-volatile memory (166) also.

Figure 3:
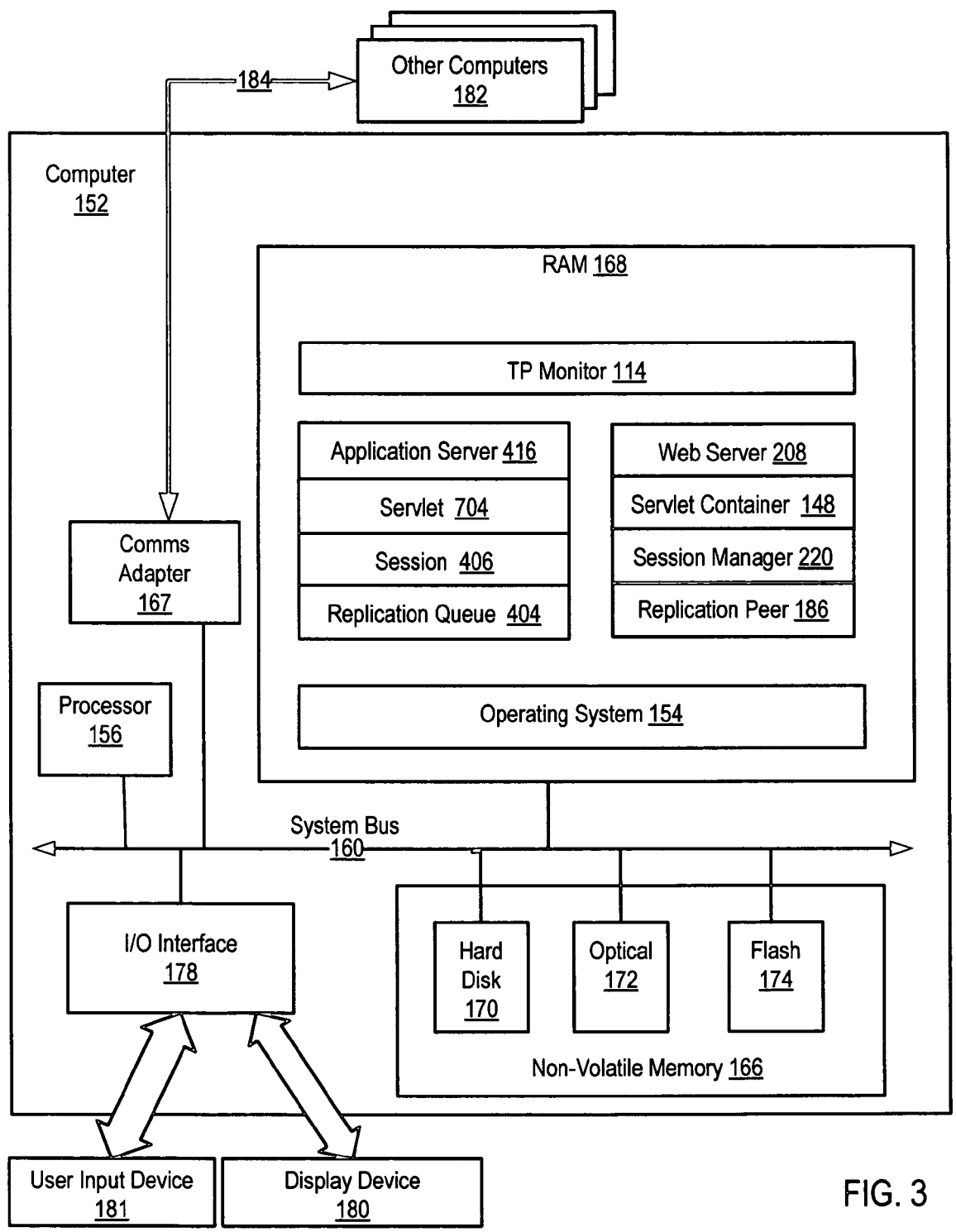
FIG. 3 sets forth a block diagram of automated computing machinery comprising an exemplary computer useful in session replication according to embodiments of the present invention.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182), including servers. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
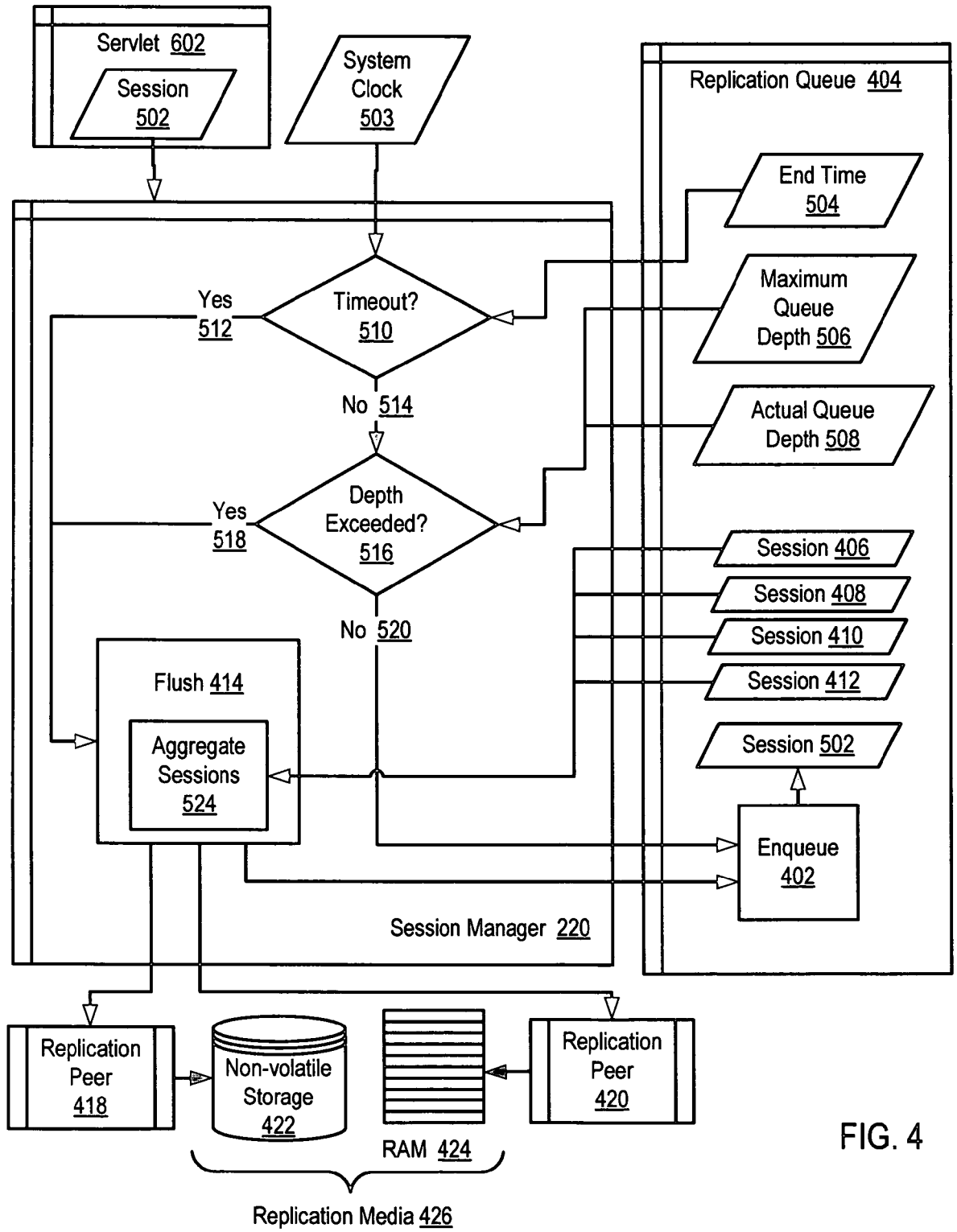
FIG. 4 sets forth a flow chart illustrating an exemplary method for session replication according to embodiments of the present invention.

For further explanation, FIG. 4 sets forth a flow chart illustrating an exemplary method for session replication according to embodiments of the present invention that includes enqueueing (402) sessions (502, 406-412) on a replication queue (404). As mentioned, sessions (502, 406-412) are data structures that maintain or store information pertinent to a group or series of requests across two or more requests for computer resources or services. A replication queue (404) is a data structure having member elements each of which represent a session to be replicated. The method of FIG. 4 also includes flushing (414) the enqueued sessions (406-412) from the replication queue (404) to a replication peer (420), in dependence upon flushing criteria (504, 506, 508), for storage on a replication medium (426). In the method of FIG. 4, as explained in more detail below, flushing (414) also includes aggregating (524) sessions from the replication queue (404) for transmission to a replication peer (418, 420).

In the method of FIG. 4, the replication medium (426) may be implemented as a non-volatile storage (422) in a database or as a remote random access memory (424). In the method of FIG. 4, flushing (414) in dependence upon flushing criteria may be effected periodically, in which case, the flushing criteria would be time-related criteria for determining periodicity, such as, for example, a maximum period between flushes and a start time, or an end time and the current time, or other period-defining criteria as will occur to those of skill in the art. In the example of FIG. 4, flushing periodically is carried out by comparing an end time (504) for a replication queue with the current time from a system clock (503). A replication queue's end time (504) is represented as metadata for the replication queue (404) in the example of FIG. 4. In the example of FIG. 4, a session manager (220), having received from an application represented by servlet (602) a session (502) for replication, determines whether a replication queue's authorized duration has been exceeded by comparing the replication queue's end time with the current time. If the current time is later than the replication queue's end time (512), the replication queue's authorized duration has been exceeded; the session manager therefore flushes the sessions (406-412) currently enqueued from the replication queue to a replication peer for storage in non-volatile storage or remote random access memory before enqueueing (402) the session (502) received from servlet (602). If the current time is not later than the replication queue's end time (514), processing continues without flusing the enqueued sessions from the replication queue.

In the method of FIG. 4, flushing (414) in dependence upon flushing criteria may be implemented in dependence upon replication queue depth. Flushing criteria for flushing in dependence upon replication queue depth are the current (or actual) queue depth (508) and the maximum allowed queue depth (506), represented as metadata in replication queue (404). Actual replication queue depth (508) is the number of sessions currently enqueued in the replication queue (404). Maximum queue depth (506) is the maximum allowed actual queue depth for a queue. In the method of FIG. 4, flushing in dependence upon replication queue depth is carried out by comparing (516) actual queue depth (508) and maximum queue depth (506) for a replication queue (404). In the example of FIG. 4, a session manager (220), having received from an application represented by servlet (602) a session (502) for replication, determines (516) whether a replication queue's actual depth (508) exceeds the queue's maximum depth (506). If the actual depth is greater than the maximum depth, the session manager flushes the sessions (406-412) currently enqueued from the replication queue to a replication peer for storage in non-volatile storage or remote random access memory before enqueueing (402) the session (502) received from servlet (602). If the actual depth is not greater than the maximum depth, the session manager enqueueing (402) the session (502) received from servlet (602) without flushing the enqueued sessions (406-412) from the replication queue.

Figure 5:
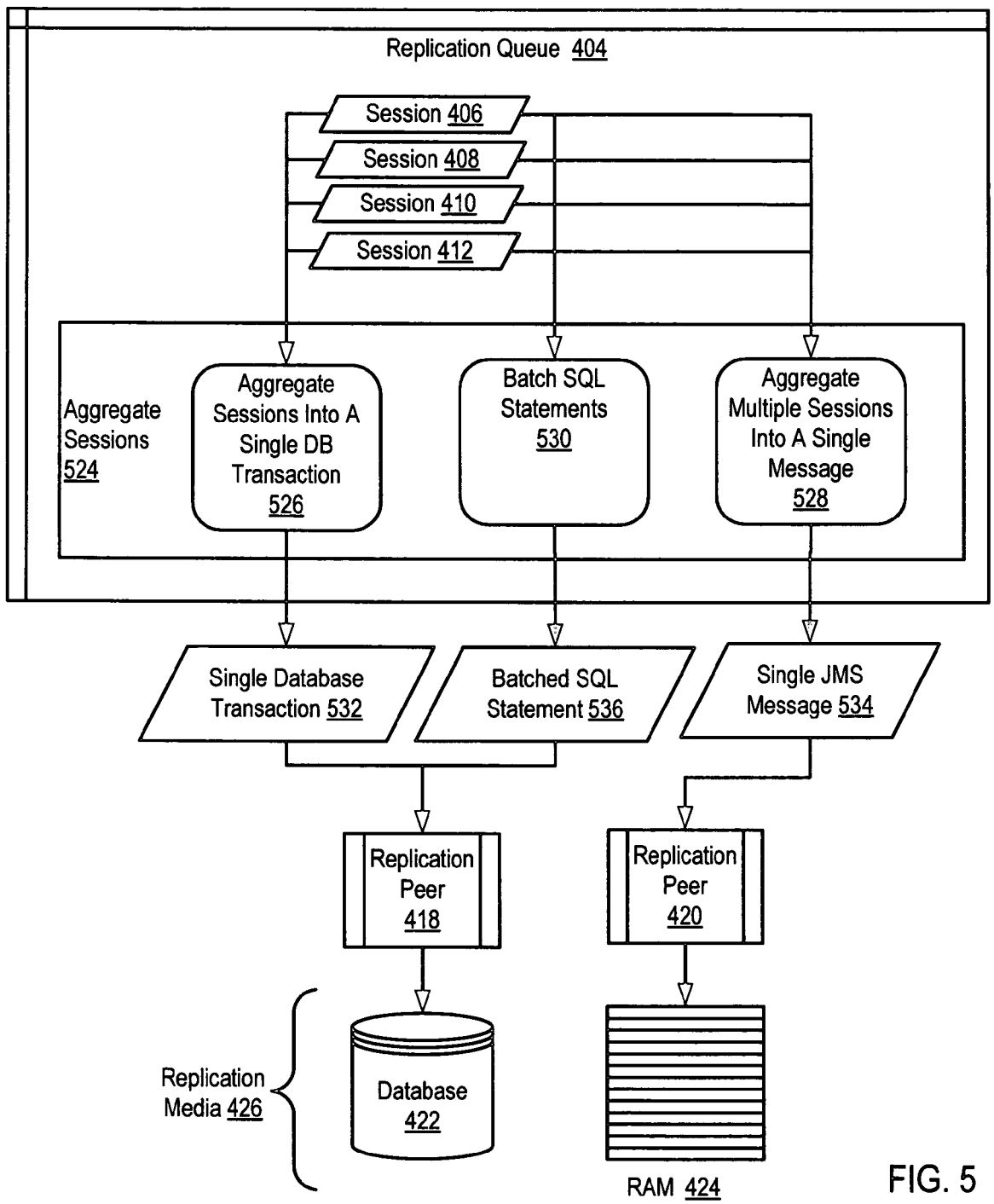
FIG. 5 sets forth a flow chart illustrating alternative exemplary methods for aggregating sessions from a replication queue for transmission to a replication peer.

For further explanation, FIG. 5 sets forth a flow chart illustrating alternative exemplary methods for aggregating (524) sessions from a replication queue (404) for transmission to a replication peer (418, 420). Alternative exemplary methods of FIG. 5 include: aggregating (526) the sessions (406-412) into a single database transaction (532), batching (530) SQL statements, and aggregating (528) multiple sessions into a single message (534). Aggregating (526) sessions (406-412) into a single database transaction (532) and batching (530) SQL statements are implemented with non-volatile storage in a database (422) as a replication medium (426). Aggregating (528) multiple sessions into a single message (534) is implemented with remote random access memory (424) as a replication medium (426).

In the example of FIG. 5, the replication medium (426) may be non-volatile storage (422) in a database, and aggregating (524) may be carried out by aggregating (526) sessions (406-412) into a single database transaction (532). A member method in a replication queue (404) may be programmed to aggregate two or more sessions, each of which would otherwise be scoped into a single replication transaction, into a single database transaction. Such a member method may take as its input sessions (406-408) in a replication queue that would otherwise be scoped for replication transactions as:

```
begin
   session1
commit,
begin
   session2
commit,
begin
   session3
commit,
``` and aggregate such sessions into a single database transaction by parsing them into an SQL transaction scoped as:

```
begin
   session1
   session2
   session3
commit.
```

In a further example of FIG. 5 where the replication medium (426) is non-volatile storage (422) in a database, aggregating (524) may be carried out by batching (530) SQL statements. Batching is combining changes in data elements from more than one session (406-412) into a single SQL statement (536). A member method in a replication queue (404) may be programmed to batch changes in data elements from more than one session into a single SQL statement by parsing calls to accessor methods in two or more sessions into a single SQL statement. Calls to:

```
session1.setUserID("User1");
session2.setUserID("User2");
session3.setUserID("User3");
``` for example, which otherwise would have been parsed into three separate SQL statements:

```
UPDATE SESSION SET USERID = "USER1"
    WHERE SESSIONID = "SESSION1",
UPDATE SESSION SET USERID = "USER2"
    WHERE SESSIONID = "SESSION2", and
UPDATE SESSION SET USERID = "USER3"
    WHERE SESSIONID = "SESSION3",
``` may now be parsed by such a new method into a single SQL UPDATE statement:

```
UPDATE SESSION
    SET USERID = "USER1" WHERE SESSIONID = "SESSION1",
    SET USERID = "USER2" WHERE SESSIONID = "SESSION2",
    SET USERID = "USER3" WHERE SESSIONID = "SESSION3".
```

In another example of FIG. 5 where the replication medium (426) is remote random access memory (424), aggregating sessions is carried out by aggregating (528) multiple sessions into a single message (534). Communications among web server (104), the application servers (124, 126, 128), and the databases (422, 138, 140) in the system of FIG. 1, for example, typically is carried out by 'messaging middleware.' Examples of messaging middleware include Java Messaging Service ('JMS'), the Java Remote Invocation ('JRI') API, and the Common Object Request Broker Architecture ('CORBA').

A member method in a replication queue (404) may be programmed to aggregate multiple JMS messages, for example, that would otherwise be sent separately, into a single JMS message in which a number of changes in session data are transmitted at the same time in the same JMS message. Such a member method may aggregate multiple sessions (528) into a single message by aggregating multiple sessions into a single serializable aggregated session object and then placing that aggregated session object into the message body of a single messaging middleware message (534). The messaging middleware message may be, for example, a JMS message containing the aggregated session object, illustrated for example by:

```
ObjectMessage message = queueSession.createObjectMessage( );
message.setObject( aggregatedSession );
queueSender.send(message);
```

Figure 6:
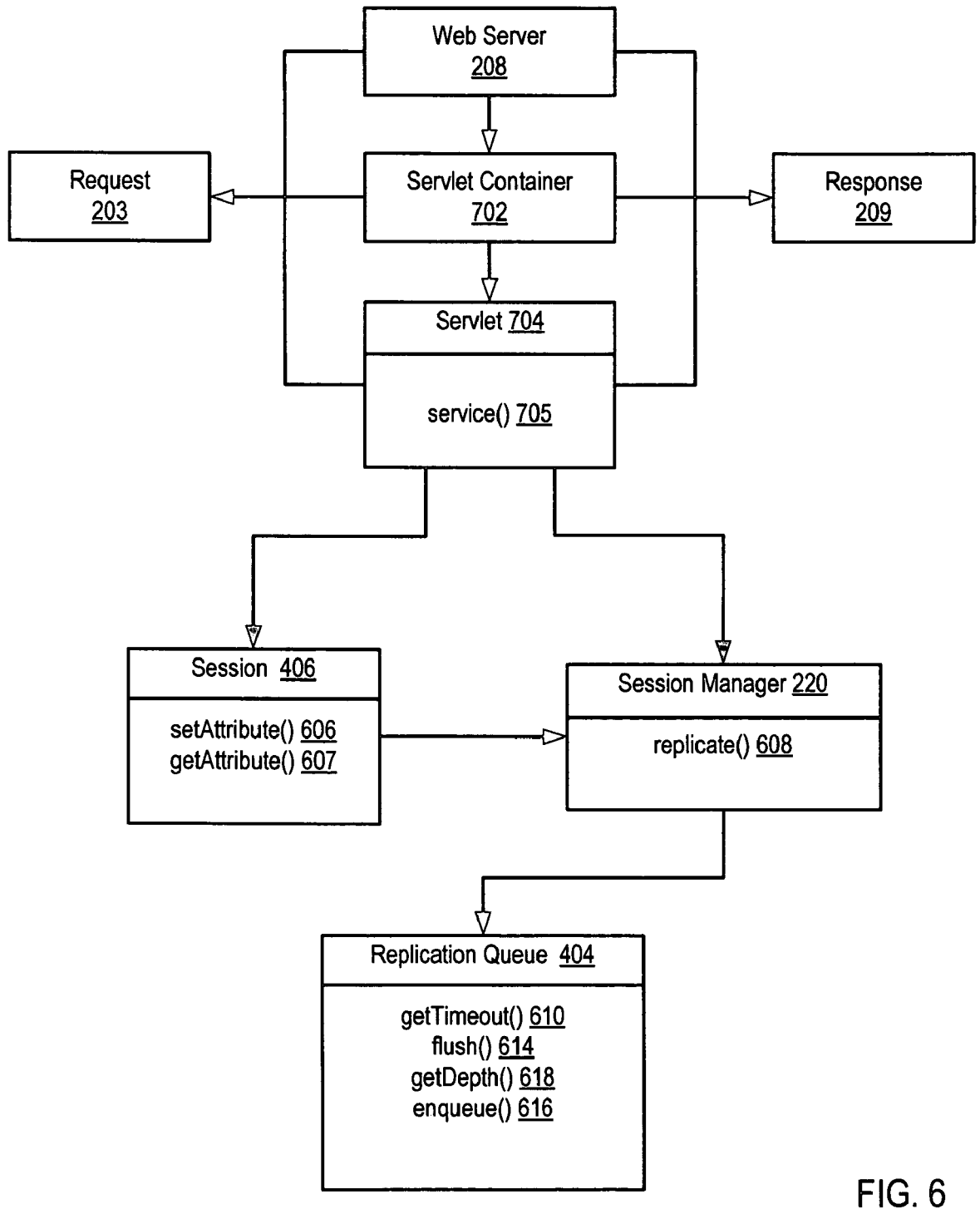
FIG. 6 sets forth a class relationship diagram illustrating an example of relationships among classes for session replication according to embodiments of the present invention.

FIG. 6 sets forth a class relationship diagram illustrating an example of relationships among classes for session replication according to embodiments of the present invention. In the class relationship diagram of FIG. 6, the solid arrows represent the possession of references; a class to which an arrow points possesses a reference to a class from which the arrow points. That is, representing an object-oriented relation of composition, a 'has-a' or 'uses-a' relationship between classes, the arrow points from a referenced class to a class whose objects possess references to the referenced class. In the example of FIG. 6, request (203) and response (209) each have a reference to a web server (208), a servlet container (702), and a servlet (704). The servlet (704) has a reference to the servlet container (702), which has a reference to the web server (208). A session manager (220) has a reference to the session (406) and the servlet (704). The session (406) has a reference to the servlet (704). The replication queue (404) has a reference to the session manager (220).

In the example of FIG. 6, HTTP Request (203) represents a request from a client for a web page, static or dynamic, from a web server (208). The servlet container (702) implements and manages servlets (704). The servlet container (702) or the web server (208) may implement a servlet (704) suitable for a web page in response to the clients request, or the servlet container (702) or the web server (208) may implement a servlet (704) suitable for a web page at start-up. The servlet container (702) or the web server (208) instantiates a servlet (704) and initializes the member data elements in the servlet (704). In the case of Java, for example, the servlet (704) may be an instance of a concrete subclass of the HttpServlet abstract class.

The servlet container (702) or the web server (208) enables the servlet (704) to access the request by passing the request object as argument to a method in the servlet (704). In the case of an HttpServlet object, for example, the servlet container (702) or the web server (208) enables the servlet (704) to handle the request by creating an HttpServletRequest object and passing it as an argument to the servlet's service( ) method (705). In a similar manner, in the case of an HttpServlet, the servlet container (702) or the web server (208) enables the servlet (704) to respond to the request by creating an HttpServletResponse object and passing it as an argument to the servlet's service( ) method (705) in the same call as the HttpServletRequest object. A web server (208), upon receiving the request, such as, for example, an HTTP GET message or an HTTP POST message, makes a method call via the servlet's service( ) method (705) to service methods, such as, for example, doGet( ) or doPost( ), to allow a servlet to handle a request, such as, for example, a GET request or a POST request.

The servlet container (702) may use an interface, such as, for example, the HttpSession interface, to create a session (406). This interface allows a servlet (704) to view and manipulate information about a session (406), such as the session identifier, creation time, and last accessed time; and get and set attributes by binding objects to sessions (406), allowing pertinent information to persist across multiple data communications connections. The servlet (704) binds objects to the session (406) by calling member functions in the session, such as, for example, in the case of a session created by using the HttpSession interface, by calling getAttribute( ) (607) and setAttribute( ) (606) from session (406) and passing the attribute name or the attribute name and the object representing the new attribute value, respectively.

In the example of FIG. 6, the servlet (704) replicates its session data by calling a member function named replicate( ) in the session manager (220), passing call parameters that identify the servlet (704) and the session (406). The session manager is deployed by the servlet container or web server during start-up. The session manager, in turn, creates the replication queue at start-up. The replicate( ) function in the session manager calls member functions in the replication queue, such as getTimeout( ), getDepth( ), flush( ), and enqueue( ), in order to effect the replication.

Figure 7:
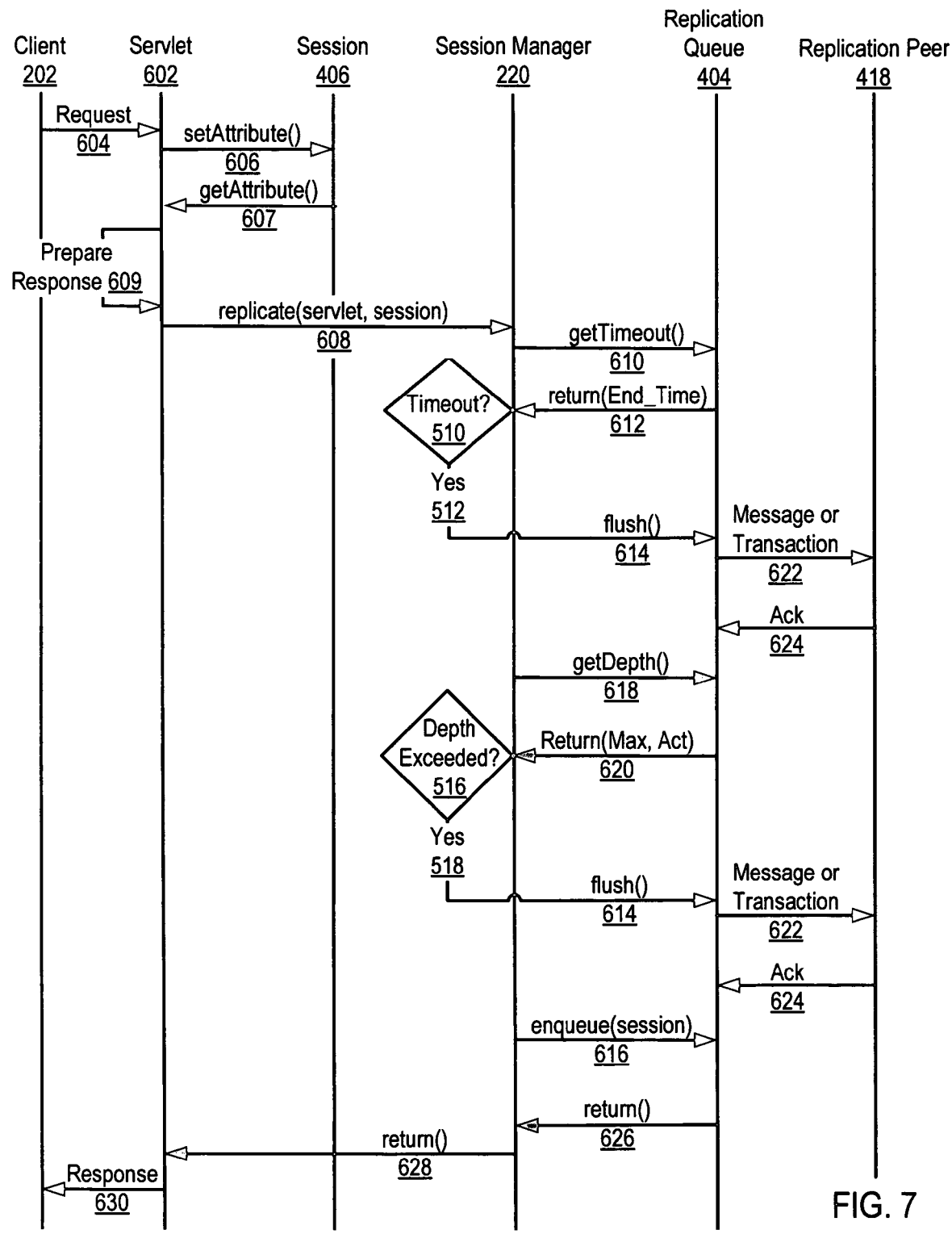
FIG. 7 sets forth a calling sequence diagram illustrating an exemplary method for session replication according to embodiments of the present invention.

For further explanation, FIG. 7 sets forth a calling sequence diagram illustrating an exemplary method for session replication according to embodiments of the present invention that begins with client (202) sending a request (604) to the web server (208), for example an HTTP GET request. A servlet container runs in the web server environment. The servlet container implements and manages servlets. In the case of Java, for example, the servlet (602) may be an instance of a concrete subclass of the HttpServlet abstract class. The servlet container may pass the HTTP request as a parameter in a method call to service methods in the servlets. In Java, for example, the servlet container may create an HttpServletRequest object from the HttpServletRequest interface which corresponds to the request, and an HttpServletResponse object from the HttpServletResponse interface which corresponds to the request. The servlet container passes the HttpServletRequest object as a parameter in a method call to the service( ) method in one of the servlets. The service( ) method, such as, for example, Servlet.service(req), dispatches the request represented by the HttpServletRequest object, req, to one of the servlet's (602) service methods, for example, doGet or doPost. Likewise, the servlet container passes the HttpServletRequest object as a parameter in the same method call. This method call passes to the servlet both the client request as received and a response object for the servlet to use in passing the response back to the web server for eventual return to the client.

The servlet (602) was configured upon deployment with a reference to an instance (406) of a session class. The session is used to contain 'session data,' data that persists across multiple request/response exchanges between client (202) and a servlet (602). Upon receiving the request, the servlet (602) calls one or more member accessor functions, which are generally in the session (406), that manage through 'set' and 'get' functions the session data that persists across multiple request/response exchanges between client (202) and servlet (602). In the case where the servlet (602) is an instance of a concrete subclass of the HttpServlet abstract class, the servlet (602) gets and sets attributes by binding objects to the session. Objects are bound to the session by calling member functions in the session, such as, for example in the case of a session created by using the HttpSession interface, getAttribute( ) (607) and setAttribute( ) (606).

GetAttribute( ) (607) is an example of an accessor function that allows the servlet to read session data previously stored in the session, as, for example, data stored during a previous request/response exchange. SetAttribute( ) (606) is an example of an accessor function that allows the servlet to store session data in the session. Only two accessor function calls (606, 607) are illustrated, but readers will recognize that zero, one, two, or more accessor calls may be made by a servlet to manage session data during any particular request/response exchange.

Having received a request, servlet (602) prepares (609) a response. Such a response is typically a static markup document, such as, for example, an HTML, XML, WML, HDML, or other as will occur to those of skill in the art. The servlet (602) may obtain the output document from a static web page or prepare the output document from a dynamic server page such as a Java Server Page ('JSP'), for example.

After preparing a response, just before returning the response, the servlet (602) replicates its session data by calling a member function named replicate( ) in session manager (220), passing call parameters that identify the servlet (602) and the session (406). The replicate( ) function is synchronized by declaring it a Java synchronous method, by using semaphores (in a non-Java setting, for example), or by any other method as will occur to those skilled in the art. The replicate( ) function in the session manager enqueues the session with a call to an enqueue( ) method (616) in a replication queue (404), passing a reference to the session as a call parameter and first flushing the queue as needed.

The timing sequence diagram of FIG. 7 illustrates two methods the replicate( ) function may use to flush the queue, one for periodic flushing and one for flushing according to queue depth. The replicate( ) function of the session manager (220) calls a member function getTimeout( ) (610) in replication queue (404) which returns (612) the reference End_Time, identifying the end time or timeout time for replication queue (404). The replicate( ) function in the session manager (220) flushes periodically by comparing (510) the end time for the replication queue (404) with the current time from a system clock (not shown). If the current time is later than the end time (512), then the replicate( ) function (608) of the session manager (220) flushes the queue with a call to the flush( ) method (614) in the replication queue (404). If the current time is not later than the end time, the replicate( ) function in the session manager may proceed to enqueue (616) the session (616) and return (628) from the replicate( ) call.

Additionally or in the alternative, the replicate( ) function may flush the replication queue according to replication queue depth. The replicate( ) function (608) in the session manager (220) obtains the current queue depth 'Act' and the maximum allowed queue depth 'Max' with a call to a member function named getDepth( ) (618) in the replication queue (404). Replication queue depth is the number of sessions held in the replication queue (404). Replication queue depth is represented in FIG. 7 by the reference 'Act' for 'Actual Queue Depth.' The getDepth( ) call in FIG. 7 also returns the maximum permitted queue depth for the replication queue, represented here by the reference 'Max.' The replicate( ) function in the session manager compares (516) the maximum allowed queue depth and the current queue depth of the replication queue (404), and if the depth of the replication queue has been exceeded (518), then the replicate( ) function in the session manager (220) calls a member function named flush( ) (614) in the replication queue (404).

The flush( ) function (614) operates to empty the replication queue by: aggregating sessions in the replication queue, serializing the results of the aggregation, and transmitting the serialized transaction to a replication peer (418).

In one example of FIG. 7, the flush( ) function (614) aggregates the sessions in the session queue by aggregating sessions into a single database transaction. The flush( ) function (614) aggregates the sessions into a single database transaction by aggregating the sessions, which are Java objects, into a single Java transaction, and then parsing the Java transaction into a SQL statement. In another example of FIG. 7, the flush( ) function (614) aggregates the sessions in the session queue by parsing the sessions into SQL statements, and subsequently batching the two or more resulting SQL statements into a single SQL statement. In another example of FIG. 7, the flush( ) function (614) aggregates the sessions in the session queue by aggregating the sessions, which are Java objects, into a single Java transaction. The flush( ) function then parses the single Java transaction into a Java Message System (JMS) message.

After the flush( ) function (614) aggregates the sessions in the session queue, the flush( ) function serializes the results of the aggregation of the sessions (406). The aggregation of the sessions by the flush( ) function will result in different forms of data structure to serialize, including a SQL statement and a JMS message, depending upon which method of aggregation the flush( ) function (614) uses. Serialization entails deconstructing the resultant data structures into a sequence of bytes for transmission and eventual reconstruction at the replication peers. Upon receipt of the serialized message or transaction from the flush( ) function (614), the replication peer sends an acknowledgement, or Ack (624). After the flush( ) function (614) in the replication queue receives the acknowledgement, the flush( ) function (614) returns to the replicate( ) function (608) in the session manager (626). The replicate( ) function in the session manager proceeds to enqueue the session (616). The replicate( ) function (608) in turn returns to the servlet (628). The servlet then sends a response (630) to the client request (604).

Use Case

For further explanation, the following use case is set forth to illustrate the efficiencies gained by session replication according to embodiments of the present invention. The following exemplary sessions are enqueued for replication in non-volatile storage in a database:

```
class sesssion1 {
    sessionID = S1;
    userID = U1;
    account_balance = 1324.00;
}
```

-continued

```
    class sesssion2 {
        sessionID = S2;
        userID = U2;
        account_balance = 5684.00;
    }
    class sesssion3 {
        sessionID = S3;
        userID = U3;
        account_balance = 9823.00;
    }
    class sesssion4 {
        sessionID = S4;
        userID = U4;
        account_balance = 14587.00;
    }
```

A replication queue traditionally would parse these four sessions into four database instructions:

```
UPDATE SESSION_FILE
    SET account_balance = 1324.00
    WHERE sessionID = S1.
UPDATE SESSION_FILE
    SET account_balance = 5684.00
    WHERE sessionID = S2.
UPDATE SESSION_FILE
    SET account_balance = 9823.00
    WHERE sessionID = S3.
UPDATE SESSION_FILE
    SET account_balance = 14587.00
    WHERE sessionID = S4.
```

The replication queue then traditionally would wrap these four database instructions in four transactions:

```
BEGIN
UPDATE SESSION_FILE
    SET account_balance = 1324.00
    WHERE sessionID = S1.
COMMIT
BEGIN
UPDATE SESSION_FILE
    SET account_balance = 5684.00
    WHERE sessionID = S2.
COMMIT
BEGIN
UPDATE SESSION_FILE
    SET account_balance = 9823.00
    WHERE sessionID = S3.
COMMIT
BEGIN
UPDATE SESSION_FILE
    SET account_balance = 14587.00
    WHERE sessionID = S4.
COMMIT
```

The replication queue then traditionally would transmit these four transactions to one or more replication peers in four middleware messages:

```
jms_message1 {
    /* MESSAGE HEADER */
    /* MESSAGE BODY */
    BEGIN
    UPDATE SESSION_FILE
        SET account_balance = 1324.00
        WHERE sessionID = S1.
    COMMIT
}
jms_message1 {
    /* MESSAGE HEADER */
    /* MESSAGE BODY */
    BEGIN
    UPDATE SESSION_FILE
        SET account_balance = 5684.00
        WHERE sessionID = S2.
    COMMIT
}
jms_message1 {
    /* MESSAGE HEADER */
    /* MESSAGE BODY */
    BEGIN
    UPDATE SESSION_FILE
        SET account_balance = 9823.00
        WHERE sessionID = S3.
    COMMIT
}
jms_message1 {
    /* MESSAGE HEADER */
    /* MESSAGE BODY */
    BEGIN
    UPDATE SESSION_FILE
        SET account_balance = 14587.00
        WHERE sessionID = S4.
    COMMIT
}
```

Each message represents the same amount of additional data communications overheads. Each transaction must be administered separately at the same overhead cost to a replication peer. And each database instruction is parsed and optimized separately by a database management system of a replication peer. Consider the result, however, when the same four sessions are replicated according to embodiments of the present invention by aggregating the sessions into a single database transaction, batching SQL statements, and aggregating multiple sessions into a single message:

```
jms_message1 {
    /* MESSAGE HEADER */
    /* MESSAGE BODY */
    BEGIN
    UPDATE SESSION_FILE
        SET account_balance = 1324.00
        WHERE sessionID = S1.
        SET account_balance = 5684.00
        WHERE sessionID = S2.
        SET account_balance = 9823.00
        WHERE sessionID = S3.
        SET account_balance = 14587.00
        WHERE sessionID = S4.
    COMMIT
}
```

Now, instead of four messages, there is only one. Instead of twelve database instructions (four BEGINs, four UPDATEs, and four COMMITs), there are only three. This is a small example using only four sessions. Readers will recognize that the efficiencies of session replication according to embodiments of the present invention are substantial when applied to replicate many sessions across many requests-response exchanges and many transactions.

Exemplary embodiments of the present invention are described largely in the context of a fully functional computer system for session replication. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for session replication, the method implemented within a multi-tiered data processing system comprising a client tier, a server tier, and a database tier; each tier comprising computing devices coupled for data communications among the tiers and coupled for data communications among the devices within the server tier;

the server tier and the database tier having disposed within them two or more replication peers; each replication peer comprising a module of automated computing machinery that has a same capability of storing on a replication medium sessions flushed from a replication queue as other modules similarly situated in the multi-tiered data processing system;

the method comprising:

enqueueing by a server in the server tier sessions on a replication queue, each session comprising information describing a group of two or more requests from a computing device in the client tier for computer resources or services; and flushing by the server enqueued sessions, from the replication queue to a replication peer, in dependence upon flushing criteria, for storage on a replication medium, including aggregating sessions from the replication queue for transmission to the replication peer;

wherein flushing in dependence upon flushing criteria further comprises flushing in dependence upon queue depth.

2. The method of claim 1 wherein the replication medium is non-volatile storage in a database.

3. The method of claim 1 wherein the replication medium is remote random access memory.

4. The method of claim 1 wherein flushing in dependence upon flushing criteria further comprises flushing periodically.

5. The method of claim 1 wherein the replication medium is non-volatile storage in a database and aggregating further comprises aggregating the sessions into a single database transaction.

6. The method of claim 1 wherein the replication medium is non-volatile storage in a database and aggregating further comprises batching SQL statements.

7. The method of claim 1 wherein the replication medium is remote random access memory and aggregating further comprises aggregating multiple sessions into a single message.

8. An apparatus for session replication, the apparatus comprising:

a multi-tiered data processing system comprising a client tier, a server tier, and a database tier; each tier comprising computing devices coupled for data communications among the tiers and coupled for data communications among the devices within the server tier;

the server tier and the database tier having disposed within them two or more replication peers; each replication peer comprising a module of automated computing machinery that has a same capability of storing on a replication medium sessions flushed from a replication queue as other modules similarly situated in the multi-tiered data processing system; and at least one computer processor, at least one computer memory operatively coupled to the computer processor, and computer program instructions disposed within the computer memory capable of:

enqueueing by a server in the server tier sessions on a replication queue, each session comprising information describing a group of two or more requests from a computing device in the client tier for computer resources or services; and flushing by the server enqueued sessions, from the replication queue to a replication peer, in dependence upon flushing criteria, for storage on a replication medium, including aggregating sessions from the replication queue for transmission to the replication peer;

wherein flushing in dependence upon flushing criteria further comprises flushing in dependence upon queue depth.

9. The apparatus of claim 8 wherein the replication medium is non-volatile storage in a database and aggregating further comprises aggregating the sessions into a single database transaction.

10. The apparatus of claim 8 wherein the replication medium is non-volatile storage in a database and aggregating further comprises batching SQL statements.

11. The apparatus of claim 8 wherein the replication medium is remote random access memory and aggregating further comprises aggregating multiple sessions into a single message.

12. A computer program product for session replication, the computer program product disposed upon a machine-readable, recordable medium, the computer program product configured for installation within a multi-tiered data processing system comprising a client tier, a server tier, and a database tier, each tier comprising computing devices coupled for data communications among the tiers and coupled for data communications among the devices within the server tier;

the server tier and the database tier having disposed within them two or more replication peers; each replication peer comprising a module of automated computing machinery that has a same capability of storing on a replication medium sessions flushed from a replication queue as other modules similarly situated in the multi-tiered data processing system;

the computer program product comprising computer program instruction for:

enqueueing by a server in the server tier sessions on a replication queue, each session comprising information describing a group of two or more requests from a computing device in the client tier for computer resources or services; and flushing by the server enqueued sessions, from the replication queue to a replication peer, in dependence upon flushing criteria, for storage on a replication medium, including aggregating sessions from the replication queue for transmission to the replication peer;

wherein flushing in dependence upon flushing criteria further comprises flushing in dependence upon queue depth.

13. The computer program product of claim 12 wherein the replication medium is non-volatile storage in a database and aggregating further comprises aggregating the sessions into a single database transaction.

14. The computer program product of claim 12 wherein the replication medium is non-volatile storage in a database and aggregating further comprises batching SQL statements.

* * * * *